United States Patent [19]  
Evans et al.

[11] 3,956,236  
[45] May 11, 1976

[54] SYNERGISTIC COMPOSITIONS FOR INCREASING FLAME RESISTANCE OF POLYMERS

[75] Inventors: Francis E. Evans, Hamburg, N.Y.; Kenneth B. Gilleo, St. Paul, Minn.

[73] Assignee: Allied Chemical Corporation, New York, N.Y.

[22] Filed: Apr. 29, 1974

[21] Appl. No.: 465,223

[52] U.S. Cl. .......................... 260/45.85 T; 252/8.1; 260/2.5 AJ; 260/45.75 T; 260/45.8 NT; 260/45.75 W; 260/45.85 R; 260/45.85 P; 260/45.85 B; 260/45.9 R; 260/45.75 C
[51] Int. Cl.²............................................. C08J 3/20
[58] Field of Search ................ 260/45.9 R, 45.8 R, 260/45.75, 2.5 AJ, 2.5 BB, 45.85 T, 45.85 P, 45.85 B, 45.85 R, 31.8 N, 31.8 XA, 31.8 J, 31.2 XA, 78 S, 75 R, 77.5 A, 77.5 SS; 117/138.8 D, 138.8 F, 138.8 N; 252/8.1

[56] References Cited  
UNITED STATES PATENTS

| | | | |
|---|---|---|---|
| 2,783,894 | 3/1957 | Lovell et al........................ | 260/78 S |
| 3,087,900 | 4/1963 | Brown.......................... | 260/45.85 T |
| 3,087,901 | 4/1963 | Brown.......................... | 260/45.85 T |
| 3,179,625 | 4/1965 | Ehrhart........................ | 260/45.85 T |
| 3,342,762 | 9/1967 | Crovatt............................ | 260/78 S |
| 3,487,122 | 12/1969 | Stengle....................... | 260/45.85 T |
| 3,531,427 | 9/1970 | Kervenski et al. .......... | 260/45.85 T |
| 3,798,198 | 3/1974 | Hole............................. | 260/45.85 T |

*Primary Examiner*—V. P. Hoke  
*Attorney, Agent, or Firm*—Anthony J. Stewart; Jay P. Friedenson

[57] ABSTRACT

A composition for increasing flame resistance of a step-reaction polymer comprising a metal salt of certain organic acids in combination with certain organic acids or their ammonium salts, the method of treating the step-reaction polymer with the composition and the resulting treated polymer.

9 Claims, No Drawings

SYNERGISTIC COMPOSITIONS FOR INCREASING FLAME RESISTANCE OF POLYMERS

This invention relates to step-reaction polymers such as nylon which exhibit improved flame resistance. More specifically, this invention relates to nylon, polyester and polyurethane polymers treated with compositions which impart improved flame resistance thereto and to the process of so treating the polymers.

In the prior art numerous compounds have been used as additives to step-reaction polymers to reduce flammability of the polymers. For example inorganic and organic tin, phosphorous and halogen containing compounds have been used to reduce flammability of nylon. These compounds have not, however, been entirely successful due to inefficiency or polymer degradation.

In addition to the tin, phosphorous and halogen containing compounds, certain compounds containing nitrogen and sulfur have been employed to improve flame resistance. While some of these nitrogen and sulfur containing compounds are an improvement over the other prior art compounds, they still do not create as much flame resistance as is desired or necessary.

BRIEF DESCRIPTION OF THE INVENTION

In accordance with this invention it has been discovered that nylon and other step-reaction polymers can be treated with certain synergistic additive compositions to give a flame resistance to the polymer which is superior to the flame resistance obtainable by known prior art compositions or methods.

The additive composition, with which the step-reaction polymer is treated, comprises:

a. a metal salt of a compound having a numerical ratio of acidic hydrogen atoms to carbon atoms of not less than 1 to 4 which compound is selected from the group consisting of mercapto-polycarboxylic acids, hydroxycarboxylic acids, polyhydroxybenzoic acids, thiocyanuric acids and thiocyanic acid; and b. a metal free organic compound selected from the group consisting of mercapto-polycarboxylic acids and their ammonium salts, hydroxycarboxylic acids and their ammonium salts, polyhydroxybenzoic acids and their ammonium salts, thiocyanuric acids and their ammonium salts, biuret, urea and ammonium thiocyanate.

The combination of a metal salt and a metal free organic compound as defined above unexpectedly provides better flame resistance to a step-wise reaction polymer than is provided by either the metal salt or metal free organic compound alone, in substantially the same amounts. The metal salt and metal free organic compound seem to act together to provide a synergistic improvement in flame resistance.

The method for increasing the flame resistance of the step-reaction polymer to obtain a step-reaction polymer having improved flame resistance comprises treating the polymer with from about 1 to about 15 weight percent of the foregoing composition.

DETAILED DESCRIPTION OF THE INVENTION

In accordance with this invention a step-reaction polymer, such as nylon, polyester or polyurethane is treated with at least about 1 and preferably about 2 weight percent of the foregoing composition. Generally less than about 15 weight percent and preferably less than about 8 weight percent of the composition is used since generally the greater percentages do not materially increase flame resistance and can sometimes cause undesirably effects such as crocking, i.e., flaking on the surface of the polymer. Lower weight percentages while providing some increase in flame resistance generally do not improve flame resistance to a desirable level. From about 3 to about 5 weight percent of composition has been found to be the preferred range in increasing flame resistance of polyurethanes.

The step-reaction polymer is generally a polymer formed by the step-wise intermolecular condensation of reactive groups. These polymers have also been known as condensation polymers and include polyesters, polyanhydrides, polyacetals, polyamides and polyurethanes. For a discussion of step-reaction polymers see *Text Book of Polymer Science* Second Edition, Fred W. Billmeyer Jr., John Wiley and Sons, Inc. 1971. The most preferred step-reaction polymers which are treated in accordance with this invention are nylon, polyurethane and polyesters.

The step-reaction polymer, e.g. nylon may be treated by wetting the surface of the polymer with a solution or emulsion containing the above composition.

The above composition preferably comprises from about 20 to about 80 weight percent of the metal salt and from about 20 to about 80 weight percent of the metal free organic compound.

The metal salt of a compound having a numerical ratio of acidic hydrogen atoms to carbon atoms of not less than 1 to 4 is selected from the group consisting the metal salts of mercapto-polycarboxylic acids, hydroxycarboxylic acids, polyhydroxybenzoic acids, thiocyanuric acids and thiocyanic acids. The metals for forming the salts, as shown in the Modern Periodic Table are the Group I, II, III, IV, V, VI, VII and VIII metals of the second, third, fourth and fifth periods. The preferred metals are Li, Na, K, Mg, Ca, Cu, Zn, Al and Sn. The most preferred metals are lithium, sodium, potassium, calcium and magnesium. Of the most preferred metals Li, Ca and Mg have been found best. The alkali metal salts are often preferable due to their availability. Cu has been found to be very good when the composition is used to treat polyurethane. The most preferred metal for general use is lithium.

As previously mentioned the metal salt is the salt of a compound having a numerical ratio of acidic hydrogen atoms to carbon atoms of not less than 1 to 4. Lower ratios of hydrogen atoms to carbon atoms are generally undesirable in that when a larger number of carbon atoms is present relative to the number of hydrogen atoms a larger percentage of carbon is provided relative to the number of functional groups in the compound. The larger number of carbon atoms generally provides a source of fuel which reduces the effectiveness of the composition for increasing flame resistance of the polymer.

As the first component of the additive composition of this invention, which may be mentioned as preferred, are alkali metal salts of thiocyanuric acid, the lithium salt of thiomalic acid, lithium tartrate, lithium malate, and lithium citrate. Other acids useful in preparing the metal salt are given above and are more fully described hereinafter.

The mercapto-polycarboxylic acids are any carboxylic acids having both a plurality of carboxylic groups and at least one —SH group. Examples of such mercapto-polycarboxylic acids are:

dimercapto succinic acid

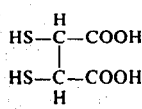

and
thiomalic acid

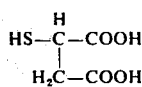

The hydroxycarboxylic acids are any carboxylic acids having at least one carboxylic acid group, and preferably a plurality of carboxylic acid groups, and at least one —OH group. Examples of such hydroxycarboxylic acids are:

malic acid citric acid tartaric acid

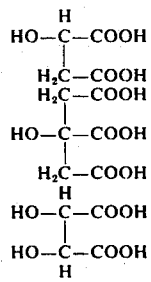

The polyhydroxybenzoic acids are benzoic acids having a plurality of —OH groups attached to the benzene ring. Examples of such polyhydroxybenzoic acids are:
gallic acid

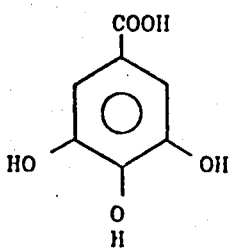

and 2,4 dihydroxybenzoic acid

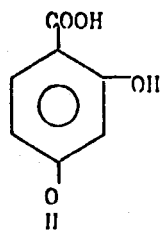

The thiocyanuric acids are triazine rings having pendent mercapto groups. The thiocyanuric acids may be substituted or unsubstituted trithiocyanuric acid, dithiocyanuric acid or monothiocyanuric acid. The alkali metal salts of thiocyanuric acids are generally preferred over other metal salts of thiocyanuric acids. While other metal thiocyanurates retain their effectiveness, even when mixed with a less effective metal free organic compound as herein described, thus showing a synergistic effect, the synergism of the alkali metal thiocyanurates is consistently greater. The structural formula of s-trithiocyanuric acid is:

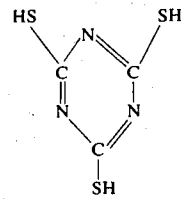

The metal free organic compound, as previously discussed is selected from the group consisting of mercaptopolycarboxylic acids and their ammonium salts, hydroxycarboxylic acids and their ammonium salts, polyhydroxybenzoic acids and their ammonium salts, thiocyanuric acids and their ammonium salts, biuret, urea and ammonium thiocyanate. Examples of the acids are listed above. Ammonium salt as used herein means the $NH_4^+$ salt or a quaternary ammonium salt formed by the addition of an amine to a carboxylic acid.

Examples of preferred metal free organic compounds are trithiocyanuric acid, ammonium citrate, ammonium malate, ammonium tartrate, ammonium thiomalate and biuret.

The best synergistic results are usually obtained when the metal free organic compound contains nitrogen and has a numerical ratio of nitrogen atoms to carbon atoms of at least 1 to 4.

In treating the step-reaction polymer in accordance with the process of this invention, from about 1 to about 15 weight percent of the treating composition as previously described in applied to the step-reaction polymer. In practicing the invention the composition is dissolved in solvent, usually water, to make a solution of about 0.5 to about 12 weight percent and more preferably from about 2 to about 8 weight percent. The step-reaction polymer, usually in the form of fabric or carpet, is then soaked by the solution which may contain other additives commonly used in finishing baths to improve properties such as penetration or water repellency. The fabric or carpet is then squeezed with any suitable apparatus such as pad rollers, to remove excess solution. The squeezing apparatus, such as the rollers, is adjusted to give from about 25 to about 300 weight percent, preferably from about 50 to about 200 weight percent and most preferably from about 75 to about 150 weight percent wet pick-up. The fabric or carpet material is then dried in air or in a dryer or oven at temperatures up to about 200°C. but preferably less than about 150°C. The solution may be applied to the step-reaction polymer in numerous ways. For example the step-reaction polymer may be immersed in the solution or the solution may be sprayed upon the step-reaction polymer or applied to the step-reaction polymer by means of pad rollers.

The following examples serve to illustrate the process and composition of the invention. Unless otherwise indicated all parts and percentages are by weight.

In the following examples the composition is applied to the step-reaction polymer by dipping the polymer, in the form of a carpet, into a solution of the composition and squeezing the dipped carpet to remove excess solution. The carpet is then dried and weighed so that the percentage of composition added to the carpet can be calculated.

The flame resistance of the carpet is then measured using a modified United States Department of Commerce test DOC FF1-70 wherein a 250 watt heat lamp is positioned 5 inches from the carpet surface and is controlled by a Variac. The lamp is turned on for 5 minutes at a preset voltage on the Variac in order to provide a more vigorous test. The higher the voltage applied to the heat lamp the greater the heat applied to the carpet prior to burning the carpet. The temperature of the carpet is measured with a thermocouple. The carpet is then burned by placing a 150 milligram methenamine pill in the center of the carpet. The pill is then ignited. The higher the temperature which can be applied to the carpet before the carpet fails to extinguish within 90 seconds after the pill has finished burning the better the flame resistant properties of the carpet.

of additive on the carpet. In each case in Table I it will be noted that when the additive is a composition comprising a mixture of a metal salt compound and metal free organic compound, the temperature at which the carpet fails the test is at least as high as and generally substantially higher then the temperature at which the carpet fails when either the metal salt or the metal free organic compound is used alone. These results indicate that a synergistic effect results from the use of the mixture of the metal salt compound and the metal free organic compound which either permits the carpet to reach a higher temperature before it fails to extinguish than can be reached through the use of either the metal salt compound or metal free organic compound alone or permits a metal salt or metal free organic compound, which is effective in increasing flame resistance of a step-reaction polymer, to retain its effectiveness even after being diluted with a less effective compound.

TABLE I

| EXAMPLE | ADDITIVE COMPOSITION | WEIGHT RATIO | PERCENT OF ADDITIVE | HIGHEST TEMP. BEFORE FAILURE IN °C. |
|---|---|---|---|---|
| 1 | Lithium thiomalate (LiTM) | | 10.0 | 90°C |
| | thiomalic acid (TM) | | 11.5 | 120°C |
| | LiTM + TM | 1:1 | 8.6 | 225°C |
| 2 | Ammonium thiomalate (NH$_4$TM) | | 8.0 | 150°C |
| | LiTM | | 10.0 | 90°C |
| | NH$_4$TM + LiTM | 1:1 | 9.8 | 250°C |
| | NH$_4$TM + LiTM | 1:3 | 10.8 | 200°C |
| 3 | Ammonium tartrate (NH$_4$Ta) | | 9.6 | 140°C |
| | Lithium tartrate (LiTa) | | 9.6 | 160°C |
| | NH$_4$Ta + LiTa | 4:1 | 10.4 | 180°C |
| | NH$_4$Ta + LiTa | 3:2 | 9.7 | 190°C |
| | NH$_4$Ta + LiTa | 1:1 | 7.9 | 180°C |
| 4 | LiTM | | 10.0 | 90°C |
| | NH$_4$Ta | | 9.6 | 140°C |
| | LiTM + NH$_4$Ta | 1:3 | 10.0 | 200°C |
| 5 | NH$_4$TM | | 8.0 | 150°C |
| | LiTa | | 9.6 | 160°C |
| | NH$_4$TM + LiTa | 3:1 | 10.5 | 200°C |
| 6 | Biuret | | 7.8 | 130°C |
| | LiTM | | 10.0 | 90°C |
| | LiTM + Biuret | 1:1 | 10.0 | 200°C |
| 7 | TM | | 11.5 | 120°C |
| | Calcium thiocyanate [Ca(SCN)$_2$] | | 8.5 | 90°C |
| | TM + Ca(SCN)$_2$ | 3:2 | 9.0 | 150°C |
| 8 | Lithium malate (LiM) | | 9.5 | 130°C |
| | Ammonium malate (NH$_4$M) | | 9.7 | 130°C |
| | LiM + NH$_4$M | 3:2 | 9.4 | 180°C |
| | LiM + NH$_4$M | 1:4 | 9.4 | 190°C |
| 9 | NH$_4$M | | 9.7 | 130°C |
| | LiTM | | 10.0 | 90°C |
| | NH$_4$M + LiTM | 1:1 | 9.4 | 180°C |
| 10 | Biuret | | 7.0 | 40°C |
| | Lithium trithiocyanuric acid (LiTCA) | | 8.5 | 90°C |
| | Biuret + LiTCA | 1:2 | 9.3 | 150°C |
| 11 | Urea | | 7.4 | 60°C |
| | Magnesium trithiocyanuric acid (MgTCA) | | 7.5 | 125°C |
| | MgTCA + Urea | 1:1 | 7.0 | 125°C |
| 12 | Lithium citrate (LiC) | | 9.5 | 160°C |
| | Ammonium citrate (NH$_4$C) | | 9.5 | 145°C |
| | LiC + NH$_4$C | 1:4 | 9.3 | 185°C |
| | LiC + NH$_4$C | 4:1 | 9.4 | 180°C |
| 13 | Gallic Acid (Ga.) | | 8.8 | 180°C |
| | LiM | | 9.5 | 130°C |
| | Ga. + LiM | 3:2 | 8.8 | 225°C |
| | LiTa | | 9.6 | 160°C |
| | Ga. + LiTa | 3:2 | 9.6 | 210°C |

EXAMPLES

The following Table I shows the highest temperature applied to the carpet before the carpet fails to extinguish within 90 seconds after the pill has finished burning, the additive composition used, and the percentages

What is claimed is:

1. A polymer selected from the group consisting of nylon, polyester and polyurethane, said polymer having from about 1 to 15 weight percent of a composition added thereto, said composition comprising:
   a. from about 20 to 80 weight percent of a metal salt of a hydrocarbyl hydroxycarboxylic acid; and b. from about 20 to 80 weight percent of a metal free organic compound selected from the group consisting of hydrocarbyl hydroxycarboxylic acids and their ammonium salts.

2. The polymer of claim 1 wherein the polymer is treated from about 2 to about 8 weight percent of the composition.

3. A method for increasing the flame resistance of a polymer selected from a group consisting of nylon, polyester and polyurethane comprising adding to the polymer from about 1 to 15 weight percent of a composition comprising:
   a. from about 20 to 80 weight percent of a metal salt of a hydrocarbyl hydroxycarboxylic acid; and
   b. from 20 to 80 weight percent of a metal free organic compound selected from the group consisting of hydrocarbyl hydroxycarboxylic acids and their ammonium salts.

4. The method of claim 3 wherein the polymer is nylon.

5. A composition for increasing flame resistance of a polymer selected from the group consisting of nylon, polyester, and polyurethane, comprising:
   a. from about 20 to 80 weight percent of a metal salt of a hydrocarbyl hydroxycarboxylic acid; and
   b. from about 20 to 80 weight percent of a metal free organic compound selected from a group consisting of hydrocarbyl hydroxycarboxylic acids and their ammonium salts.

6. The composition of claim 5 wherein the metal salt is a lithium, sodium, potassium, calcium or magnesium metal salt.

7. The composition of claim 6 wherein the metal salt is lithium salt.

8. The composition of claim 6 wherein the metal salt is lithium tartrate, lithium malate, or lithium citrate.

9. The composition of claim 3 wherein the metal free organic compound is ammonium citrate, ammonium malate or ammonium tartrate.

* * * * *

UNITED STATES PATENT AND TRADEMARK OFFICE
CERTIFICATE OF CORRECTION

PATENT NO. : 3,956,236
DATED : May 11, 1976
INVENTOR(S) : Francis E. Evans and Kenneth B. Gilleo It is certified that error appears in the above-identified patent and that said Letters Patent are hereby corrected as shown below:

Column 6, line 6, "then" should read --than--

Column 7, line 6, "treated from" should read --treated with from--

Column 8, line 17, "3" should read --6--.

Signed and Sealed this

Twenty-seventh Day of July 1976

[SEAL]

Attest:

RUTH C. MASON
Attesting Officer

C. MARSHALL DANN
Commissioner of Patents and Trademarks